United States Patent
Kim et al.

(10) Patent No.: US 9,652,172 B2
(45) Date of Patent: May 16, 2017

(54) DATA STORAGE DEVICE PERFORMING MERGING PROCESS ON GROUPS OF MEMORY BLOCKS AND OPERATION METHOD THEREOF

(71) Applicant: SK hynix Inc., Gyeonggi-do (KR)

(72) Inventors: Jin Woong Kim, Gyeonggi-do (KR); Ji Hong Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 39 days.

(21) Appl. No.: 14/820,302

(22) Filed: Aug. 6, 2015

(65) Prior Publication Data

US 2016/0291871 A1 Oct. 6, 2016

(30) Foreign Application Priority Data

Apr. 6, 2015 (KR) .................. 10-2015-0048521

(51) Int. Cl.
*G06F 3/06* (2006.01)

(52) U.S. Cl.
CPC ............ *G06F 3/064* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2015/0347295 A1* | 12/2015 | Ihm ...................... | G06F 12/0253 711/103 |
| 2015/0378816 A1* | 12/2015 | Kawamura ............... | G06F 3/06 714/766 |
| 2016/0124848 A1* | 5/2016 | Bellorado ........... | G06F 12/0253 711/103 |
| 2016/0232088 A1* | 8/2016 | Mohan ................ | G06F 12/0253 |
| 2016/0267004 A1* | 9/2016 | Perlstein ............. | G06F 12/0246 |

FOREIGN PATENT DOCUMENTS

KR 100789406 12/2007

* cited by examiner

*Primary Examiner* — Kevin Verbrugge
(74) *Attorney, Agent, or Firm* — IP & T Group LLP

(57) ABSTRACT

A data storage device capable of improving operation performance by optimizing internal operations is disclosed. The operation method of the data storage device includes grouping memory blocks based on the number of valid pages included in each of the memory blocks; and determining whether to perform a merging process on the groups of memory blocks based on a merging determination value.

20 Claims, 9 Drawing Sheets

FIG.4

Merging Determination Table

| Group | G1 | G2 |
|---|---|---|
| Number of valid pages | 30~70 | Less than 30 More than 70 |
| Weight | W1=5 | W2=1 |
| Number of blocks | 20 | 80 |
| Block Address | 2,5,7,9 , ... | 1,3,4,6,8, ... |

| Threshold | R1 = 100 | R2 = 200 |
|---|---|---|
| Number of times of merging (Or Number of victim blocks) | 0 | 30 |

DATA STORAGE DEVICE PERFORMING MERGING PROCESS ON GROUPS OF MEMORY BLOCKS AND OPERATION METHOD THEREOF

CROSS-REFERENCES TO RELATED APPLICATION

This application claims priority under 35 U.S.C, 119(a) to Korean application No. 10-2015-0048521 filed on Apr. 6, 2015, in the Korean intellectual property Office, which is incorporated by reference in its entirety.

BACKGROUND

1. Technical Field

The inventive concept relates to a data storage device and, more particularly, to a data storage device capable of improving operation performance by optimizing internal operations and an operating method thereof.

2. Related Art

In recent years, the paradigm of the computing environment has changed to ubiquitous computing where computer systems can be used anytime anywhere. Therefore, the use of portable electronic devices such as portable phones, digital cameras, and laptop computers has rapidly increased. Data storage devices using memory devices are generally used in portable electronic devices. Data storage devices are used as main memory devices or auxiliary memory devices of portable electronic devices.

Data storage devices using memory devices have no moving parts, and therefore have good stability, durability, high information access rates, and low power consumption. Data storage devices having such advantages include universal serial bus (USB) memory devices, memory cards having various interfaces, and solid state drives (hereinafter, referred to as SSDs).

As large data files such as music and videos are stored in portable electronic devices, the data storage devices need to be large. The data storage devices may include a memory device having highly integrated memory cells, for example, a flash memory device.

Flash memory devices do not support data overwrite due to structural characteristics. That is, it is impossible to update invalid data of programmed memory cells to other valid data. Therefore an erase operation has to be performed to the programmed memory cells in advance. This process is referred to as an "erase-before-program" operation. That is, before the valid data is programmed in currently programmed memory cells of the flash memory device, the currently programmed memory cells have to be returned to an initial state or an erased state prior to being programmed again.

However, it takes long time to perform an erase operation in the flash memory device. Thus, a controller of the data storage device does not perform an erase operation directly on the programmed memory cells. Instead, the controller of the data storage device programs the valid data into the memory cells that have been erased.

Through the above-described operation of the controller in the data storage device, the flash memory device stores both valid data and invalid data. In some cases, the controller of the data storage device performs a merging process during which valid data are collected into a concentrated region, and the invalid data are erased.

SUMMARY

One or more exemplary embodiments are provided to a data storage device capable of improving operation performance by optimizing an internal operation and an operation method thereof.

According to an embodiment, there is provided an operation method of a data storage device including a plurality of memory blocks. The operation method may include grouping the plurality of memory blocks based on the number of valid pages included in each of the plurality of memory blocks; and determining whether to perform a merging process on the groups of memory blocks based on a merging determination value, which is obtained by the following equation.

$$MD = \sum_{n=1}^{m} GDn, \ GDn = BLKn \times Wn, \quad \text{[Equation]}$$

wherein "MD" is the merging determination value, "m" is the total number of the groups of memory blocks, BLKn is the number of memory blocks included in each of the groups of memory blocks, and Wn is a weight assigned to each of the groups of memory blocks.

According to an embodiment, a data storage device is provided. The data storage device may include a nonvolatile memory device including memory blocks, each of the memory blocks including pages; and a controller suitable for: grouping the plurality of memory blocks based on the number of valid pages included in each of the memory blocks; and determining whether to perform a merging process on the groups of memory blocks based on a merging determination value, which is obtained by the following equation.

$$MD = \sum_{n=1}^{m} GDn, \ GDn = BLKn \times Wn, \quad \text{[Equation]}$$

wherein "MD" is the merging determination value, "m" is the total number of the groups of memory blocks, BLKn is the number of memory blocks included in each of the groups of memory blocks, and Wn is a weight assigned to each of the groups of memory blocks.

According to an embodiment, operation speed of a data storage device may be improved.

These and other features, aspects, and embodiments are described below in the section entitled "DETAILED DESCRIPTION".

BRIEF DESCRIPTION OF THE DRAWINGS

The above and other aspects, features and advantages of the subject matter of the present disclosure will be more clearly understood from the following detailed description taken in conjunction with the accompanying drawings, in which:

FIG. 4 is a view exemplarily illustrating a merging determination table shown in FIG. 2;

DETAILED DESCRIPTION

Figure 1:
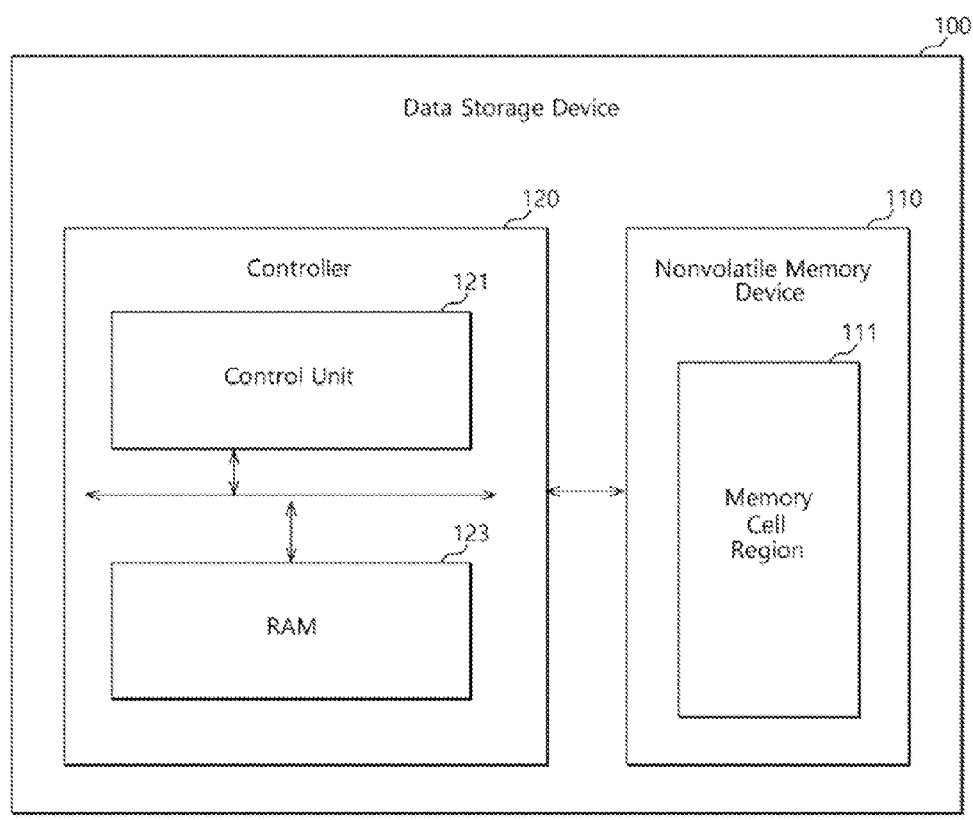
FIG. 1 is a block diagram exemplarily illustrating a data storage device according to an embodiment of the inventive concept.

Various embodiments will now be described more fully with reference to the accompanying drawings in which some embodiments are shown. These inventive concepts may, however, be embodied in different forms and should not be construed as limited to the embodiments set forth herein. Although a few embodiments of the inventive concept will be shown and described, it will be appreciated by those of ordinary skill in the art that changes may be made in these exemplary embodiments without departing from the principles and spirit of the inventive concept, the scope of which is defined by the claims and their equivalents.

In the drawings, the embodiments are not limited to specific forms, and the specific forms may be exaggerated for clarity. The terminology used herein to describe embodiments of the invention is not intended to limit the scope of the invention. Unless otherwise defined, all terms (including technical and scientific terms) used herein are to be interpreted as is customary in the art to which this invention belongs.

The term "and/or" used in this application includes any and all combinations of one or more referents. The term "connected to/coupled to" another element or layer means the layer can be directly on, connected or coupled to the other elements or layers or intervening elements or layers may be present. Elements of the invention referred to in the singular may number one or more, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in greater detail with reference to the accompanying drawings.

FIG. 1 is a block diagram exemplarily illustrating a data storage device according to an embodiment of the inventive concept. A data storage device 100 may store data accessed by a host device (not shown) such as a portable phone, a MP3 player, a laptop computer, a desktop computer, a game machine, a television (TV), or an in-vehicle infotainment system. The data storage device 100 may be called a memory system.

The data storage device 100 may be fabricated with any one of various types of storage devices according to an interface protocol coupled to the host device. For example, the data storage device 100 may be configured in any one among the various types of storage devices such as a solid state drive (SSD), a multimedia card (MMC) in the form of an eMMC RS-MMC, and micro-MMC, a secure digital card in the form of an SD, mini-SD, and micro-SD, a universal storage bus (USB) storage device, a universal flash storage (UFS) device, a personal computer memory card international association (PCMCIA) card type storage device, a peripheral computer interconnection (PCI) card type storage device, a PCI-express (PCI-E) card type storage device, a compact flash (CF) card, a smart media card, and a memory stick.

The data storage device 100 may be fabricated in any of the various types of packages. For example, the data storage device 100 may be fabricated in any of the various types of packages such as package on package (POP), system in package (SIP), system on chip (SOC), multi chip package (MCP), chip on board (COB), wafer-level fabricated package (WFP), and wafer-level processed stack package (WSP).

The data storage device 100 may include a nonvolatile memory device 110. The nonvolatile memory device 110 may be operated as a storage medium of the data storage device 100. The nonvolatile memory device 110 may include a NAND flash memory device. Alternatively, the nonvolatile memory device 110 may include various types of nonvolatile memory devices such as a NOR flash memory device, a ferroelectric random access memory (FRAM) using a ferroelectric capacitor, a magnetic RAM (MRAM) using a tunneling magneto-resistive (TMR) film, a phase-change RAM (PRAM) using a chalcogenide alloy, and a resistive RAM (RERAM) using a transition metal oxide.

The data storage device 100 may include a controller 120. The controller 120 may include a control unit 121 and a RAM 123.

The control unit 121 may control overall operations of the controller 120. The control unit 121 may analyze a signal input from a host device and process the analyzed signal. For this, the control unit 121 may decode firmware or software loaded into the RAM 123, and drive the decoded firmware or software. The control unit 121 may be realized in the form of hardware or a combination of hardware and software.

The RAM 123 may store the firmware or software driven by the control unit 121. The RAM 123 may store data required for driving of the firmware or software, for example, meta data. That is, the RAM 123 may be operated as a working memory of the control unit 121. The RAM 123 may be configured to temporarily store data to be transmitted to the nonvolatile memory device 110 from the host device or data to be transmitted to the host device from the nonvolatile memory device 110. That is, the RAM 123 may be operated as a data buffer memory or a data cache memory.

Figure 2:
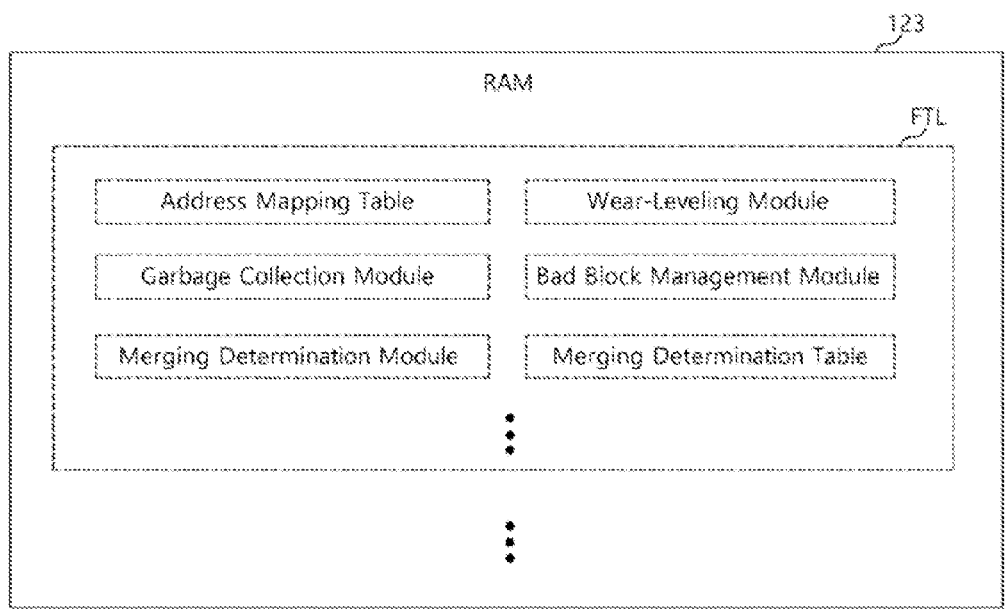
FIG. 2 is a view exemplarily illustrating firmware or software driven in a working memory illustrated in FIGS. 1 and 2.

FIG. 2 is an illustration of firmware or software driven in the working memory described with reference to FIG. 1.

When the nonvolatile memory device 110 includes a NAND flash memory device, the control unit 121 may control an erase operation in units of memory blocks, and control a read or programming operation in units of pages. Further, since the nonvolatile memory device 110 cannot perform an overwrite operation, the control unit 121 may control the erase operation to store new data in a memory cell of currently programmed state.

The control unit 121 of the data storage device 100 which uses a flash memory device as a data storage medium may drive firmware or software called a flash translation layer (FTL) to control the operation of the flash memory device, and provide compatibility with the host device. Through driving of the FTL, the host device may use the data storage device 100 as a general data storage device such as a hard disk drive.

The FTL loaded into the RAM 123 may be configured of modules performing various functions and meta-data required for the driving of the modules. Referring to FIG. 2, the FTL may include, for example, an address mapping table, a garbage collection module, a wear-leveling module, a bad block management module, a merging determination module, and a merging determination table. The configuration of the FTL is not limited to the above-described modules, and the FTL may further include modules such as an interleaving module configured to operate flash memory devices in parallel or a sudden power-off management module for preparation for sudden power-offs.

When the host device accesses the data storage device 100, for example, when the host device requests a read operation or a write operation, the host device may provide a logical address to the data storage device 100. The FTL may convert the provided logical address to a physical address of the nonvolatile memory device 110, and perform a requested operation based on the converted physical address. Address conversion data, that is, an address mapping table may be included in the FTL to perform the address conversion operation.

The wear-leveling module may manage wear-levels of memory blocks in the nonvolatile memory device 110. The memory cells of the nonvolatile memory device 110 may be worn by the programming and erase operations. The worn memory cells may result in defects (for example, physical defects). The wear-leveling module may manage the memory blocks so that erase-write counts of the memory blocks are equalized to prevent a specific memory block from being worn faster than other memory blocks.

The garbage collection module may manage memory blocks in which fragmented data is stored. When the nonvolatile memory device 110 is configured of a flash memory device, the nonvolatile memory device 110 cannot perform the overwrite operation as described above, and the erase unit may be greater than the program unit in the nonvolatile memory device 110. Thus, when a storage space in the nonvolatile memory device 110 reaches a certain limit, an operation that collects valid data physically distributed in different positions to the same address region using a certain empty space may be necessary. The garbage collection module may perform the operation that collects the fragmented valid data to the same address region by performing a plurality of write operations and a plurality of erase operations.

The bad block management module may manage memory blocks in which defects are caused among the memory blocks of the nonvolatile memory device 110. As described above, defects (for example, physical defects) may be caused in the worn memory cell. Data stored in the defective memory cell may not be normally read out. Further, data is not normally stored in the defective memory cell. The bad block management module may manage the memory block including the defective memory cell not to be used.

During the wear-leveling operation, the garbage collection operation, and the bad block management operation, a series of operations, for example, copying pieces of valid data of target memory blocks (hereinafter, referred to as victim blocks) to other memory blocks, updating address mapping of regions in which the pieces of copied valid data are stored, and removing the victim blocks, may be performed. This series of operations may be defined as a merging process.

The merging process may be performed while other operations are performed in response to the request of the host or during an internal operation for managing the nonvolatile memory device 110 regardless of the request from the host device. Since the merging process includes a programming operation for copying the valid data to a new memory block from the victim block and an erase operation for erasing the victim block, it takes a lot of resources and processing time for the controller 120 to perform the merging process. Therefore, optimizing processing points and time duration for the merging process may improve the operation speed of the data storage device 100.

The merging determination module may determine the processing point or whether to perform the merging process based on the merging determination table. When it is determined that it is necessary to perform the merging process, the merging determination module may determine the time duration or how many merging processes need to be performed, which corresponds to the number of victim blocks, based on the merging determination table.

The merging determination table may include information for the merging determination module. For example, the merging determination table may include number of valid pages in each group of memory blocks, addresses and number of memory blocks included in each group of memory blocks, weights for each group of memory blocks, comparison thresholds, how many merging processes correspond to the number of the victim blocks, or the like. An example of the merging determination table will be described with reference with FIG. 4.

Figure 3:
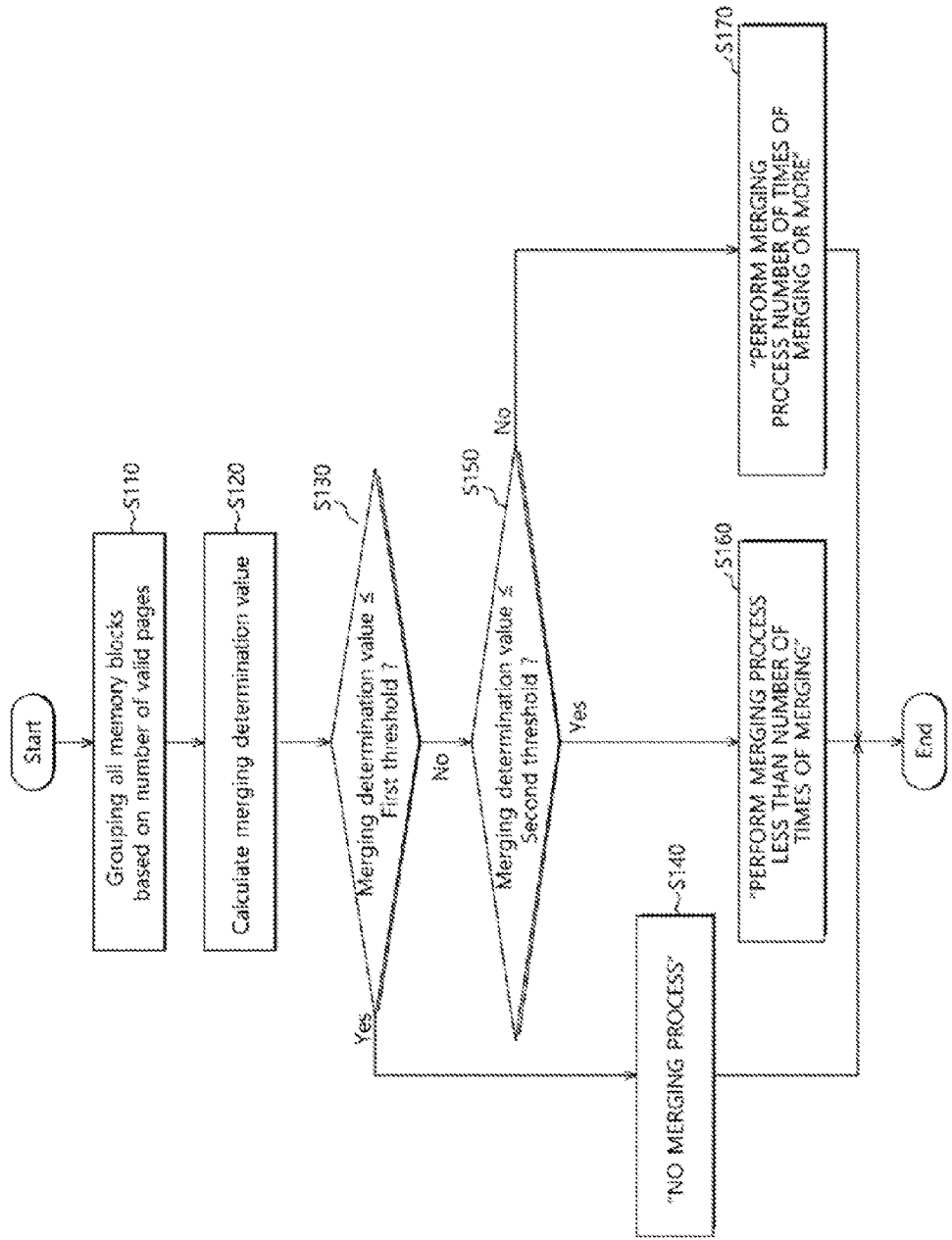
FIG. 3 is a flowchart illustrating an operation method of a data storage device illustrated in FIG. 1.

FIG. 3 is a flowchart illustrating an operation method of a data storage device described with reference to FIGS. 1 and 2. An operation method of the controller 120 for determining whether to perform the merging process and for determining how many merging processes correspond to the number of the victim blocks will be described with reference to the flowchart of FIG. 3.

In step S110, all memory blocks may be grouped based on the number of valid pages per memory block. For example, memory blocks in which the number of valid pages is included in a range of a first minimum value and a first maximum value may be grouped as a first group. An average value of the first minimum value and the first maximum value may be half the number of pages constituting one memory block. In another example, memory blocks in which the number of valid pages is included in a range of a second minimum value and a second maximum value, which may exemplarily be equal to or smaller than the first minimum value, and memory blocks in which the number of pages is included in a range of a third minimum value, which may exemplarily be equal to or greater than the first maximum value, and a third maximum value may be grouped as a second group.

In step S120, a merging determination value MD may be calculated. The merging determination value MD may be calculated by the following Equation 1.

$$MD = \sum_{n=1}^{m} GDn, \; GDn = BLKn \times Wn \qquad \text{[Equation 1]}$$

In Equation 1, "m" is the total number of groups of memory blocks, BLKn is the number of memory blocks included in each group of memory blocks, and Wn is a weight assigned to each group of memory blocks.

According to Equation 1, each group determination value GDn for each group of memory blocks may be calculated, and a merging determination value MD may be calculated by summing up all of the group determination values GD1 to GDm for all of the "m" groups of memory blocks.

The weights of the groups may be set to different values. A first weight may be assigned to the first group of the memory blocks in which the number of valid pages is in the range of the first minimum value to the first maximum value. A second weight may be assigned to the second group of the memory blocks in which the number of valid pages is in the range of the second minimum value to the second maximum value and the memory blocks in which the number of pages is in the range of the third minimum value to the third maximum value. The first weight may be greater than the second weight.

In step S130, it is determined whether the merging determination value MD is equal to or less than a first threshold. The first threshold may be a reference value for determining whether to perform the merging process.

When the merging determination value MD is equal to or less than the first threshold, which represents that the valid pages are concentrated on specific memory blocks, the concentration of the valid pages may represent a "clean" state where the valid pages are not distributed in multiple memory blocks and thus the merging process is not necessary. Therefore, at step S140, it may be determined not to perform the merging process ("NO MERGING PROCESS").

When the merging determination value MD is greater than the first threshold, which represents that the valid pages are distributed in multiple memory blocks, the distribution of the valid pages may represent a "dirty" state and thus the merging process is necessary. Therefore, it may be determined to perform the merging process, and the process may proceed to step S150.

In step S150, it is determined whether the merging determination value MD is equal to or less than a second threshold. The second threshold may be greater than the first threshold. The second threshold may be a reference value for determining how many merging processes to be performed. A single merging process may be performed to a single target memory block, that is, a single victim block, and thus the number of merging processes may correspond to the number of victim blocks. The number of merging processes corresponding to the number of the victim blocks may be determined through step S150.

When the merging determination value MD is equal to or less than the second threshold, this represents that the degree of distribution of the valid pages is not great. Therefore, at step S160, it may be determined to perform the merging process less than a predetermined number of merging times ("PERFORM MERGING PROCESS LESS THAN NUMBER OF TIMES OF MERGING").

When the merging determination value MD is greater than the second threshold, this represents that the degree of distribution of the valid pages is great. Therefore, at step S170, it may be determined to perform the merging process more than the predetermined number of merging times ("PERFORM MERGING PROCESS NUMBER OF TIMES OF MERGING OR MORE").

When whether to perform the merging process and the number of times of the merging processes corresponding to the number of the victim blocks are determined at steps S140, S160, and S170, the merging process as a subsequent process may be performed the determined number of merging times.

Figure 5:
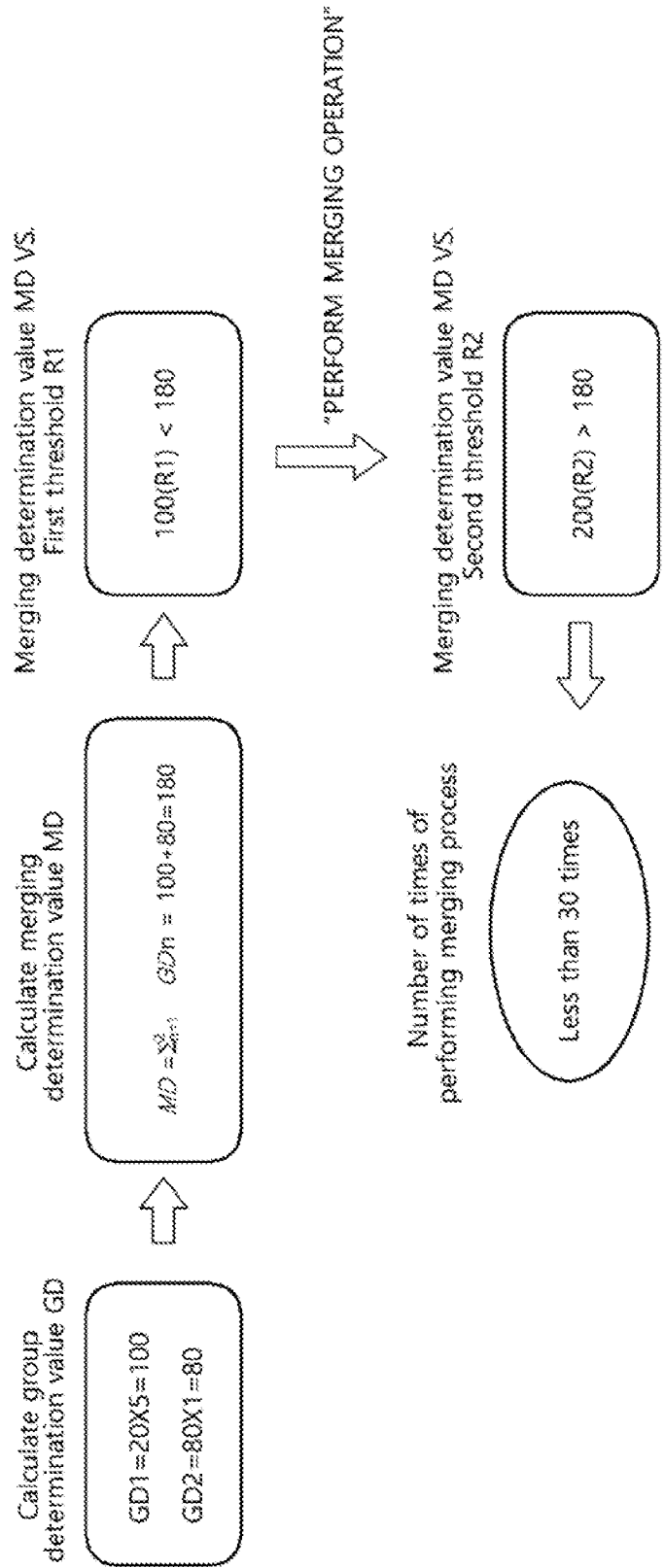
FIG. 5 is a view exemplarily illustrating an operation of a merging determination module performed with reference to a merging determination table illustrated in FIGS. 2 to 4.

FIG. 4 is a view exemplarily illustrating the merging determination table described with reference to FIG. 2. FIG. 5 is a view illustrating an operation of the merging determination module performed with reference to the merging determination table illustrated in FIGS. 2 to 4. For clarity, the merging determination table and the operation of the merging determination module will be described by taking an example of the memory cell region 111 of 100 memory blocks, each of which include 100 pages.

The merging determination table may include information of two or more groups of memory blocks, each of which is grouped according to the number of valid pages in each memory block. A first group G1 may be configured of memory blocks having valid pages close to half the total number of valid pages, and a second group G2 may be configured of the remaining memory blocks of the memory cell region 111. A greater weight may be assigned to the first group G1, and a smaller weight may be assigned to the second group G2.

Referring to FIG. 4, for example, 20 memory blocks of memory block addresses 2, 5, 7, 9, and so forth, in each of which the number of valid pages is 30 or more and 70 or less (close to half of the total pages in each memory block or 50) may be grouped as the first group G1. A first weight W1 of "5" may be assigned to the first group G1. The remaining 80 memory blocks of the memory block addresses 1, 3, 4, 6, 8, and so forth, in each of which the number of valid pages is less than 30 and more than 70 may be grouped as the second group G2. A second weight W2 of "1" may be assigned to the second group G2.

The merging determination table may include information of two or more thresholds for determining whether to perform the merging process and a required number of times of the merging processes to be performed, and information of the number of times of the merging processes corresponding to each of the thresholds. The first threshold may serve for determining whether to perform the merging process. The second threshold, which is greater than the first threshold, may serve for determining the number of times of performing the merging processes. More thresholds greater than the second threshold may additionally used to subdivide the number of times of performing the merging processes.

Referring to FIG. 4, for example, the merging determination table may include information for the first threshold R1 of "100" and the second reference R2 of "200". When it is necessary to subdivide the number of times of performing the merging processes, information of a third threshold R3, for example, of "300" and the number of times of the merging processes corresponding to the third threshold R3 may be included in the merging determination table. The thresholds R1 and R2 are merely exemplary, and may be changed to optimize the merging process.

The number of merging times or the number of times of the merging processes of "0 (zero)" may be assigned to the first threshold R1 and the number of merging times of "30" may be assigned to the second threshold R2. The numbers of merging times assigned to the thresholds are merely exemplary, and may be changed to optimize the merging process.

The merging determination operation of the merging determination module performed based on the merging determination table will be exemplarily described with reference to FIG. 5.

The group determination values GD1 to GDm of the groups of the memory blocks may be calculated. For example, a value in which the number of memory blocks included in the first group G1 is multiplied by the weight of the first group G1, that is, 100 (=20×5) may be calculated as the group determination value GD1 of the first group G1. A value in which the number of memory blocks included in the second group G2 is multiplied by the weight of the second group G2, that is, 80 (=80×1) may be calculated as the group determination value GD2 of the second group G2.

A total sum of the group determination values GD1 to GDm of the groups may be calculated to obtain the merging determination value MD. For example, the sum (=180) as the merging determination value MD may be calculated by summing up the group determination value GD1 (=100) of the first group G1 and the group determination value GD2 (=80).

Then, the merging determination value MD may be compared with the first threshold R1, as described with reference to step S130 of FIG. 3. The merging determination value MD (=180) is greater than the first threshold R1 (=100), and thus it may be determined to perform the merging process.

Then, to determine how many merging processes to be performed, the merging determination value MD may be compared with the second threshold R2, as described with reference to step S150 of FIG. 3. The merging determination value MD (=180) is smaller than the second threshold R2 (=200) and thus it may be determined to perform the merging processes less than the number of merging times of "30" assigned to the second threshold R2.

Figure 6:
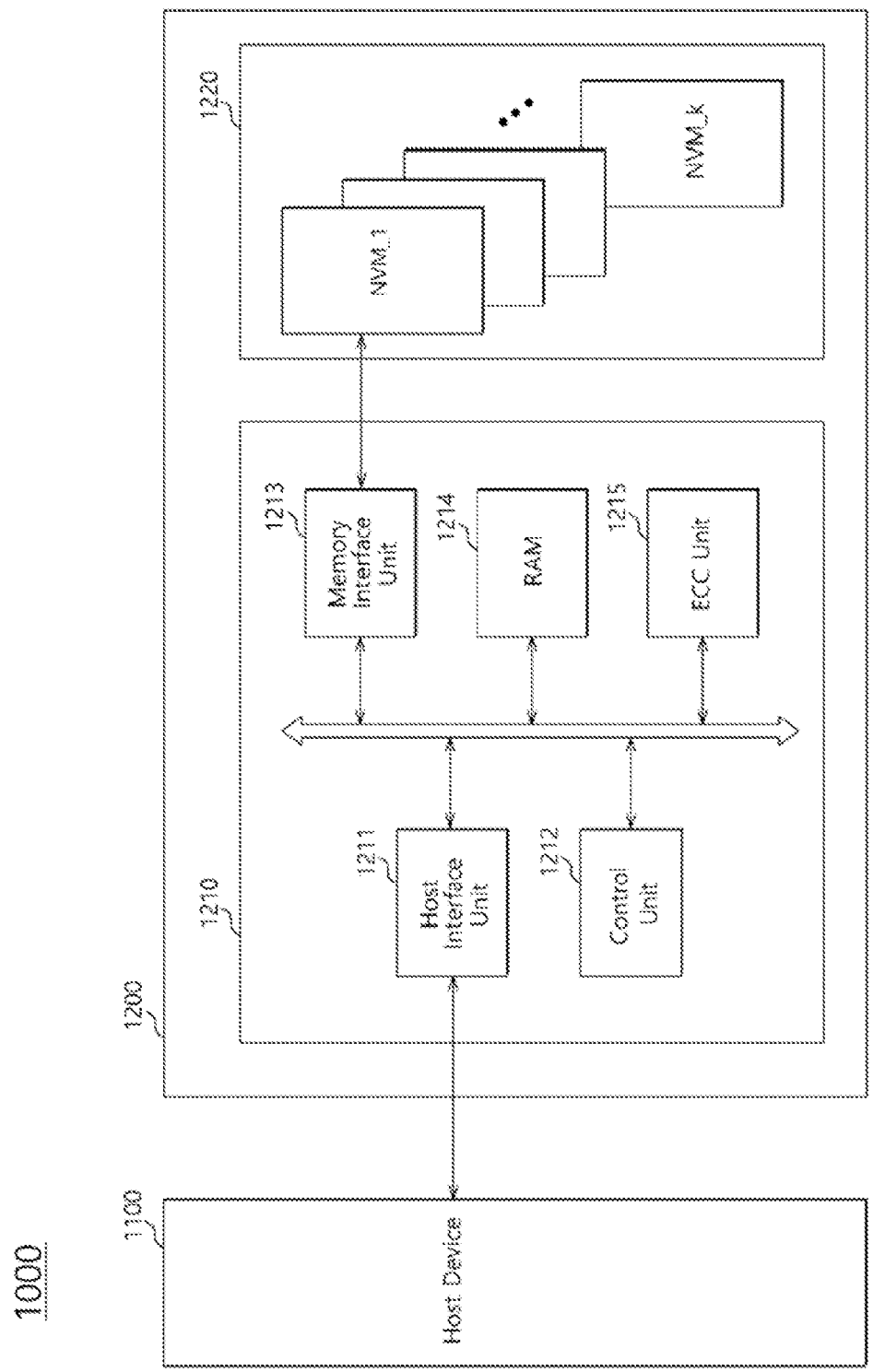
FIG. 6 is a block diagram exemplarily illustrating a data processing system including a data storage device according to an embodiment of the inventive concept.

FIG. 6 is a block diagram exemplarily illustrating a data processing system including a data storage device according to an embodiment of the inventive concept.

A data processing system 1000 may include a host device 1100 and a data storage device 1200. The data storage device 1200 may include a controller 1210 and a nonvolatile memory device 1220. The data storage device 1200 may be accessed by the host device 1100 such as a portable phone, a MP3 player, a laptop computer, a desktop computer, a game machine, a TV, or an in-vehicle system, and used.

The controller 1210 may include a host interface unit 1211, a to control unit 1212, a memory interface unit 1213, a RAM 1214, and an error correction code (ECC) unit 1215.

The control unit 1212 may control overall operation of the controller 1210 in response to a request of the host device 1100. The control unit 1212 may drive firmware or software for controlling the nonvolatile memory device 1220. The control unit 1212 may perform the merging determination operation described with reference to FIG. 3.

The RAM 1214 may be used as a working memory of the control unit 1212. The RAM 1214 may be used as a buffer memory which temporarily stores data read out from the nonvolatile memory device 1220 or data provided from the host device 1100.

The host interface unit 1211 may perform interfacing between the host device 1100 and the controller 1210. For example, the host interface unit 1211 may perform communication with the host device 1100 through one of various interface protocols such as a USB protocol, a UFS protocol, a MMC protocol, a PCI protocol, a PCI-E protocol, a parallel advanced technology attachment (PATA) protocol, a serial advanced technology attachment (SATA) protocol, a small computer system interface (SCSI) protocol, and a serial attached SCSI (SAS) protocol.

The memory interface unit 1213 may perform interfacing between the controller 1210 and the nonvolatile memory device 1220. The memory interface unit 1213 may provide a command and an address to the nonvolatile memory device 1220. The memory interface unit 1213 nay exchange data with the nonvolatile memory device 1220.

The ECC unit 1215 may detect an error of data read out from the nonvolatile memory device 1220. The ECC unit 1215 may be configured to correct the detected error when the detected error is in a correctable range.

The nonvolatile memory device 1220 may be used as a storage medium of the data storage device 1200. The nonvolatile memory device 1220 may include a plurality of nonvolatile memory chips (or dies) NVM1_1 to NVM_k.

The controller 1210 and the nonvolatile memory device 1220 may be fabricated with one of various data storage devices. For example, the controller 1210 and the nonvolatile memory device 1220 may be integrated in one semiconductor device and fabricated with any one of a multimedia card in the form of an MMC, an eMMC, an RS-MMC, and a micro-MMC, a secure digital card in the form of an SD, a mini-SD, and a micro-SD, a USB storage device, a UFS device, a PCMCIA card, a CF card, a smart media card, and a memory stick.

Figure 7:
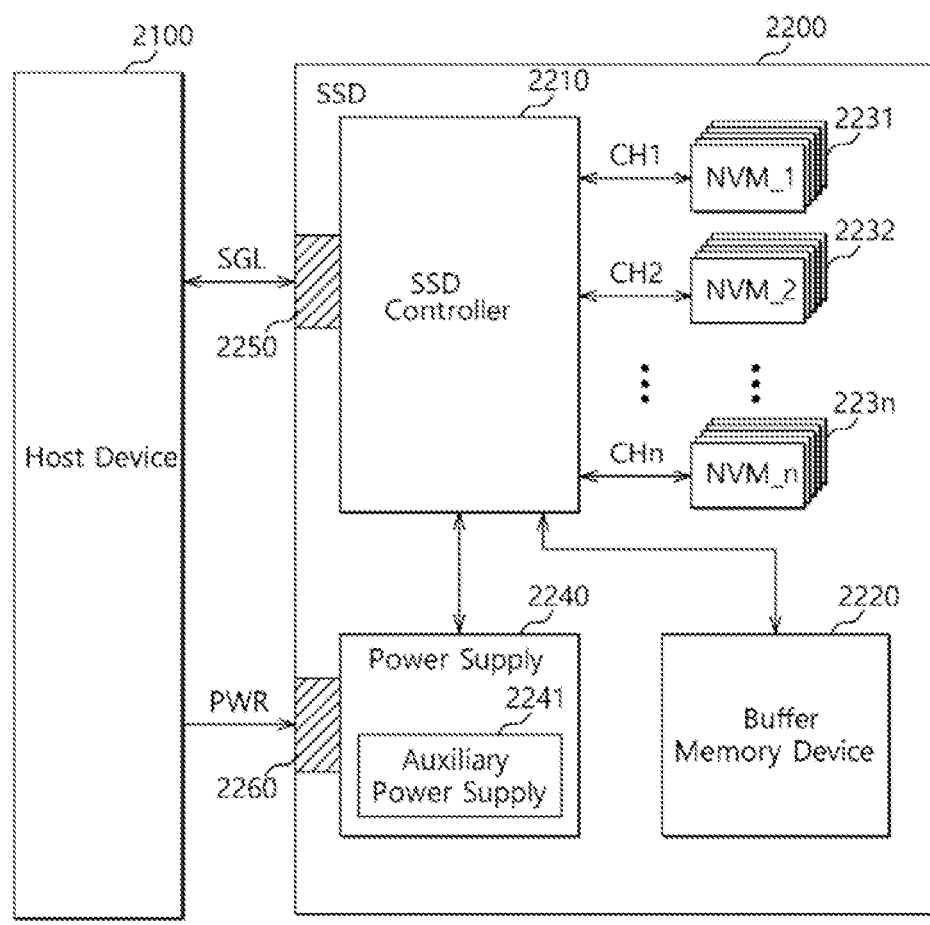
FIG. 7 is a block diagram exemplarily illustrating a data processing system including an SSD according to an embodiment of the inventive concept.

FIG. 7 is a block diagram exemplarily illustrating a data processing system including an SSD according to an embodiment of the inventive concept.

A data processing system 2000 may include a host device 2100 and a SSD 2200.

The SW 2200 may include a SSD controller 2210, a buffer memory device 2220, nonvolatile memory devices 2231 to 223n, a power supply 2240, a signal connector 2250, and a power connector 2260.

The SSD controller 2210 may access the nonvolatile memory devices 2231 to 223n in response to a request from the host device 2100.

The buffer memory device 2220 may temporarily store data to be stored in the nonvolatile memory devices 2231 to 223n. The buffer memory device 2220 may temporarily store data read out from the nonvolatile memory devices 2231 to 223n. The data temporarily stored in the buffer memory device 2220 may be transmitted to the host device 2100 or the nonvolatile memory devices 2231 to 223n according to control of the SSD controller 2210.

The nonvolatile memory devices 2231 to 223n may be used as storage media of the SSD 2200. Each of the nonvolatile memory devices 2231 to 223n may have the same configuration as the nonvolatile memory device 110 described with reference to FIGS. 1 to 3, and may perform the same operation as the operation of the nonvolatile memory device described with reference to FIGS. 4 to 7. The nonvolatile memory devices 2231 to 223n may be coupled to the SSD controller 2210 through a plurality of channels CH1 to CHn. One or more nonvolatile memory devices may be coupled to one channel. The nonvolatile memory devices coupled to one channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply power so that the SSD 2200 is normally terminated in a sudden power-off. The auxiliary power supply 2241 may include super capacitors which may charge the power PWR.

The SSD controller 2210 may exchange a signal SGL with the host device 2100 through the signal connector 2250. The signal SGL may include a command, an address, data, and the like. The signal connector 2250 may be configured of a connector such as PATA, SATA, SCSI, SAS, PCI, or PCI_E.

Figure 8:
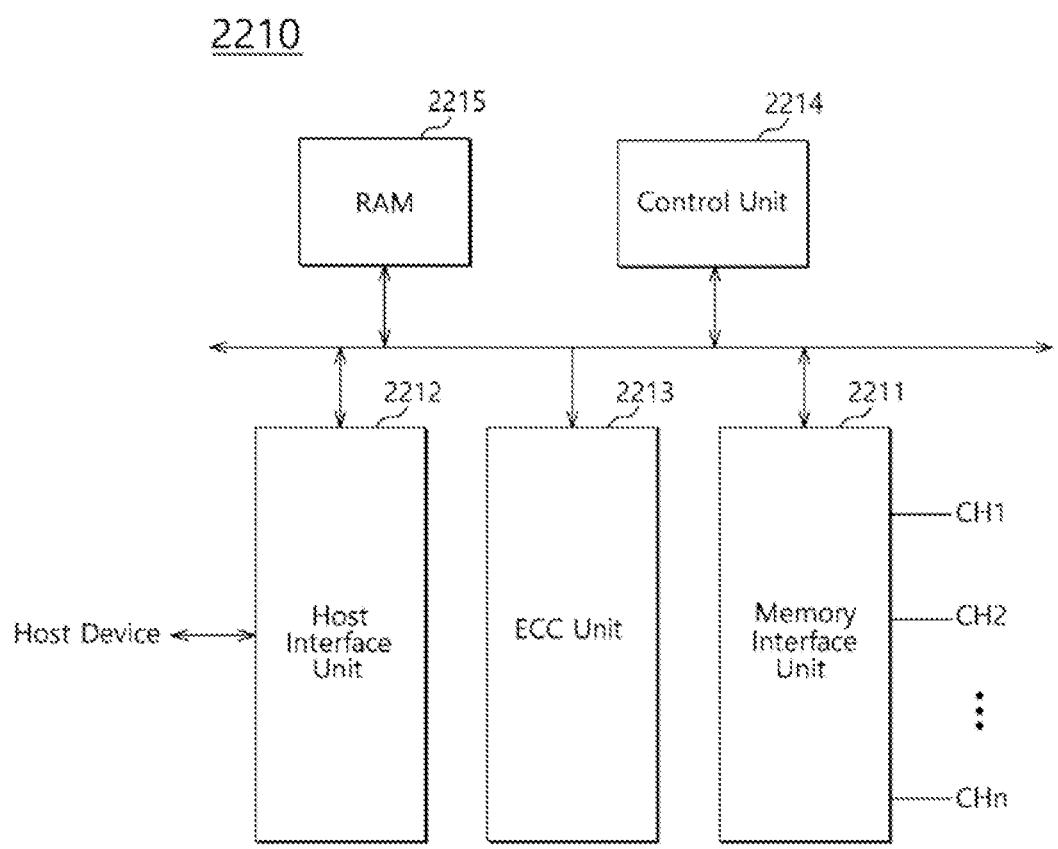
FIG. 8 is a block diagram exemplarily illustrating an SSD controller illustrated in FIG. 7.

FIG. 8 is a block diagram exemplarily illustrating the SSD controller illustrated in FIG. 7. Referring to FIG. 8, the SSD controller 2210 may include a memory interface unit 2211, a host interface unit 2212, an ECC unit 2213, a control unit 2214, and a RAM 2215.

The memory interface unit 2211 may provide a control signal such as a command and an address to the nonvolatile memory devices 2231 to 223$n$. The memory interface unit 2211 may exchange data with the nonvolatile memory devices 2231 to 223$n$. The memory interface unit 2211 may perform scattering on data transmitted from the buffer memory device 2220 to the channels CH1 to CHn according to control of the control unit 2214. The memory interface unit 2211 may transmit the data read out from the nonvolatile memory devices 2231 to 223$n$ to the buffer memory device 2220 according to control of the control unit 2214.

The host interface unit 2212 may perform interfacing with the SSD 2200 in response to a protocol of the host device 2100. For example, the host interface unit 2212 may perform communication with the host device 2100 through a PATA protocol a SATA protocol, a SCSI protocol, a PCI protocol, or a PCI-E protocol. The host interface unit 2212 may perform a disc emulation function which supports the host device 2100 recognizing the SSD 2200 as a hard disc drive (HDD).

The ECC unit 2213 may generate parity data based on data transmitted to the nonvolatile memory devices 2231 to 223$n$. The generated parity data may be stored in the nonvolatile memory devices 2231 to 223$n$ together with the data. The ECC unit 2213 may detect an error of data read out from the nonvolatile memory devices 2231 to 223$n$. When the detected error is in a correctable range, the ECC unit 2213 may correct the detected error.

The control unit 2214 may analyze the signal SGL input from the host device 2100, and process the analyzed signal SGL. The control unit 2214 may control operations of the buffer memory device 2220 and the nonvolatile memory devices 2231 to 223$n$ according to firmware or software for driving the SSD 2200. The control unit 2214 may perform the merging determination operation described with reference to FIG. 3.

The RAM 2215 may be used as a working memory for driving the firmware or software.

Figure 9:
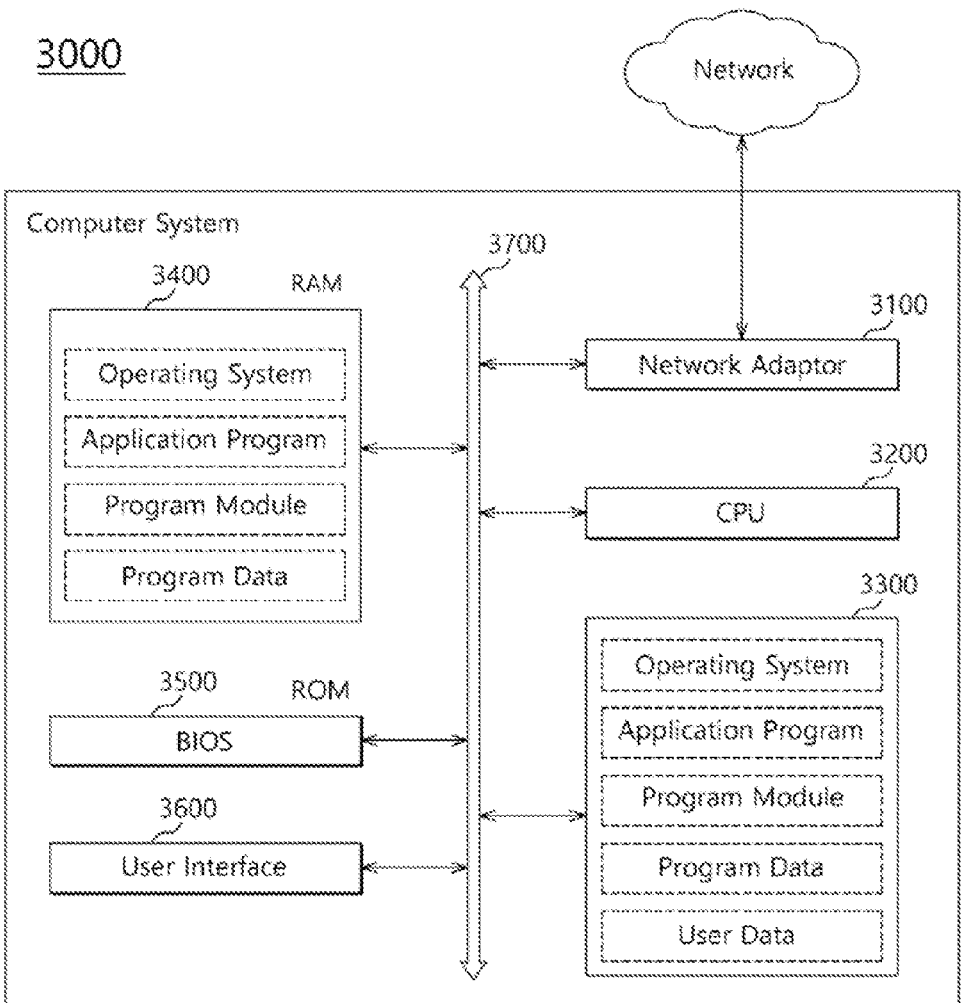
FIG. 9 is a block diagram exemplarily illustrating a computer system mounted with a data storage device according to an embodiment of the inventive concept.

FIG. 9 is a block diagram exemplarily illustrating a computer system mounted with a data storage device according to an embodiment of the inventive concept. Referring to FIG. 9, a computer system 3000 may include a network adaptor 3100, a central processing unit (CPU) 3200, a data storage device 3300, a RAM 3400, a read only memory (ROM) 3500, and a user interface 3600 which are electrically coupled to a system bus 3700. The data storage device 3300 may be configured of the data storage device 100 illustrated in FIG. 1, a data storage device 1200 illustrated in FIG. 6, or the SSD 2200 illustrated in FIG. 7.

The network adaptor 3100 may provide interfacing between the computer system 3000 and external networks. The CPU 3200 may perform various operation processes for driving an operation system or application program residing in the RAM 3400.

The data storage device 3300 may store various pieces of data required for the computer system 3000. For example, the data storage device 3300 may store an operating system, application program, various program modules, program data, user data, and the like which are for driving the computer system 3000.

The RAM 3400 may be used as a working memory of the computer system 3000. In booting of the computer system, the operating system, application program, various program modules, and program data required for driving the programs read out from the data storage device 3300 may be loaded into the RAM 3400. A basic input/output system (BIOS) which is activated even before the operating system is driven may be stored in the ROM 3500. The information exchange between the computer system 3000 and the user may be performed through the user interface 3600.

The above embodiment of the present invention is illustrative and not limitative. Various alternatives and equivalents are possible. The invention is not limited by the embodiments described herein. Nor is the invention limited to any specific type of semiconductor device. Other additions, subtractions, or modifications are obvious in view of the present disclosure and are intended to fall within the scope of the appended claims.

What is claimed is:

1. An operation method of a data storage device including a controller and a plurality of memory blocks, the operation method comprising:
grouping, by the controller, the memory blocks based on a number of valid pages included in each of memory blocks;
calculating, by the controller, a merging determination value using following equation, $$MD = \sum_{n=1}^{m} GDn, \ GDn = BLKn \times Wn, \quad \text{[Equation]}$$

wherein "MD" is the merging determination value, "m" is the total number of the groups of memory blocks, BLKn is the number of memory blocks included in each of the groups of memory blocks, and Wn is a weight assigned to each of the groups of memory blocks,
comparing, by the controller, the merging determination value with a first threshold; and
determining, by the controller, whether to perform a merging process on the groups of memory blocks based on a comparison result.

2. The operation method of claim 1, wherein the determining of whether to perform the merging process determines not to perform the merging process when the merging determination value is equal to or less than the first threshold.

3. The operation method of claim 1, wherein the determining of whether to perform the merging process determines to perform the merging process when the merging determination value is greater than the first threshold.

4. The operation method of claim 3, further comprising determining how many times the merging processes are performed based on the merging determination value when the merging determination value is greater than the first threshold.

5. The operation method of claim 4, wherein the merging processes are performed a first number of times when the merging determination value is equal to or less than a second threshold, which is greater than the first threshold.

6. The operation method of claim 4, wherein the merging processes are performed a second number of times when the merging determination value is greater than a second threshold, which is greater than the first threshold.

7. The operation method of claim 3, further comprising determining the number of victim blocks, which are targets of the merging process, based on the merging determination value when the merging determination value is greater than the first threshold.

8. The operation method of claim 1,
wherein the grouping groups one or more of the plurality of memory blocks in which the number of valid pages is included in a range of a first minimum value and a first maximum value, as a first group, and
wherein the grouping groups one or more of the plurality of memory blocks in which the number of valid pages is included in a range of a second minimum value and a second maximum and in a range of a third minimum value and a third maximum value, as a second group.

9. The operation method of claim 8, wherein an average value of the first minimum value and the first maximum value is equal to half the number of pages constituting each of the memory blocks.

10. The operation method of claim 8, wherein the second maximum value is equal to or less than the first minimum value, and the third minimum value is equal to or greater than the first maximum value.

11. The operation method of claim 1, wherein the weight is different for each of the groups of memory blocks.

12. A data storage device comprising:
a nonvolatile memory device including memory blocks, each of the memory blocks including pages; and
a controller suitable for:
grouping the plurality of memory blocks based on the number of valid pages included in each of the memory blocks; and
determining whether to perform a merging process on the groups of memory blocks based on a merging determination value, which is obtained by following equation, $$MD = \sum_{n=1}^{m} GDn, \; GDn = BLKn \times Wn,$$ [Equation]

wherein "MD" is the merging determination value, "m" is the total number of the groups of memory blocks, BLKn is the number of memory blocks included in each of the groups of memory blocks, and Wn is a weight assigned to each of the groups of memory blocks.

13. The data storage device of claim 12, wherein the controller determines not to perform the merging process when the merging determination value is equal to or less than a first threshold.

14. The data storage device of claim 12, wherein the controller determines to perform the merging process when the merging determination value is greater than the first threshold.

15. The data storage device of claim 14, wherein the controller further determines how many times to perform the merging process based on the merging determination value when the merging determination value is greater than the first threshold.

16. The data storage device of claim 15, wherein the controller performs the merging process a first number of times when the merging determination value is equal to or less than a second threshold, which is greater than the first threshold.

17. The data storage device of claim 15, wherein the controller performs the merging process a second number of times when the merging determination value is greater than a second threshold, which is greater than the first threshold.

18. The data storage device of claim 15, wherein the controller determines the number of victim blocks, which are targets of the merging process, based on the merging determination value when the merging determination value is greater than the first threshold.

19. The data storage device of claim 12, wherein the controller groups memory blocks in which the number of valid pages is included in a range of a first value and a second value, as a first group, and groups remaining memory blocks as a second group.

20. The data storage device of claim 12,
wherein the controller groups one or more of the memory blocks in which the number of valid pages is in a range of a first minimum value and a first maximum value, as a first group, and
wherein the controller groups one or more of the memory blocks in which the number of valid pages is included in a range of a second minimum value and a second maximum and in a range of a third minimum value and a third maximum value, as a second group.

* * * * *